US007006232B2

(12) United States Patent
Rollins et al.

(10) Patent No.: US 7,006,232 B2

(45) Date of Patent: Feb. 28, 2006

(54) PHASE-REFERENCED DOPPLER OPTICAL COHERENCE TOMOGRAPHY

(75) Inventors: Andrew M. Rollins, Highland Heights, OH (US); Joseph A. Izatt, Raleigh, NC (US); Volker Westphal, Hannover (DE); Cameron J. Pedersen, Cleveland Heights, OH (US); Siavash Yazdanfar, Durham, NC (US)

(73) Assignees: Case Western Reserve University, Cleveland, OH (US); University of Hospitals of Cleveland, Cleveland, OH (US)

( * ) Notice: Subject to any disclaimer, the term of this patent is extended or adjusted under 35 U.S.C. 154(b) by 274 days.

(21) Appl. No.: 10/408,745

(22) Filed: Apr. 7, 2003

(65) Prior Publication Data

US 2003/0227631 A1 Dec. 11, 2003

Related U.S. Application Data

(60) Provisional application No. 60/370,198, filed on Apr. 5, 2002.

(51) Int. Cl.
*G01B 9/02* (2006.01)

(52) U.S. Cl. ...................................... 356/479; 356/497

(58) Field of Classification Search ................ 356/497, 356/479; 600/476
See application file for complete search history.

(56) References Cited

U.S. PATENT DOCUMENTS

| | | | | |
|---|---|---|---|---|
| 5,994,690 A * | 11/1999 | Kulkarni et al. | ............ | 356/479 |
| 6,006,128 A * | 12/1999 | Izatt et al. | .................. | 600/476 |
| 6,134,003 A * | 10/2000 | Tearney et al. | ............. | 356/479 |
| 6,549,801 B1 * | 4/2003 | Chen et al. | ................. | 600/476 |

* cited by examiner

*Primary Examiner*—Gregory J. Toatley, Jr.
*Assistant Examiner*—Patrick Connolly
(74) *Attorney, Agent, or Firm*—Renner, Otto, Boisselle and Sklar, LLP

(57) ABSTRACT

A phase-referenced Doppler optical coherence tomography (OCT) system includes a low-coherence optical radiation source and a reference source co-propagated to a sample arm and a reference arm. The low-coherence and reference optical radiation reflected from the reference and arms is detected by a pair of detectors, yielding OCT and reference interferometric data output signals. The reference interferometric data output signal can be used to correct the OCT interferometric to yield velocity-indicating images that are free from defects due to sample motion and/or interferometer jitter.

26 Claims, 5 Drawing Sheets

PHASE-REFERENCED DOPPLER OPTICAL COHERENCE TOMOGRAPHY

CROSS-REFERENCE TO RELATED APPLICATIONS

This application claims priority under 35 U.S.C. §119 from Provisional Application Ser. No. 60/370,198 filed Apr. 5, 2002, the entire disclosure of which is incorporated herein by reference.

TECHNICAL FIELD

The present invention relates generally to the field of optical coherence tomography and, more particularly, to a method and device for phase-referenced doppler optical coherence tomography.

BACKGROUND

Optical coherence tomography (OCT) is a technology that allows for non-invasive, cross-sectional optical imaging of biological media with high spatial resolution and high sensitivity. OCT is an extension of low-coherence or white-light interferometry, in which a low temporal coherence light source is utilized to obtain precise localization of reflections internal to a probed structure along an optic axis. In OCT, this technique is extended to enable scanning of the probe beam in the direction perpendicular to the optic axis, building up a two-dimensional reflectivity data set, used to create a cross-sectional gray-scale or false-color image of internal tissue backscatter.

OCT has been applied to imaging of biological tissue in vitro and in vivo, as well as high resolution imaging of transparent tissues, such as ocular tissues. U.S. Pat. No. 5,944,690 provides a system and method for substantially increasing the resolution of OCT and also for increasing the information content of OCT images through coherent signal processing of the OCT interferogram data.

Doppler OCT or Doppler OCT flow imaging is a functional extension of OCT. Doppler OCT (also referred to as Color Doppler OCT) employs low-coherence interferometry to achieve depth-resolved imaging of reflectivity and flow in biological tissues and other turbid media. In Doppler OCT, a scanning optical delay line (ODL) and optical heterodyne detection yield an interferogram with fringe visibility proportional to the electric field amplitude of the light returning from the sample and fringe frequency proportional to the differential phase delay velocity between the interferometer arms. For flow imaging, a variety of processing techniques have been employed to generate estimates of instantaneous fringe frequency. Deviation of fringe frequency from the expected Doppler shift imposed by the ODL can be taken as flow in the sample.

Color Doppler OCT systems continue to improve in sensitivity. Some systems have been developed, which are sensitive enough to flow velocity, such that jitter due to instability of the interferometer components and/or motion of the sample with respect to the OCT interferometer becomes a limiting source of phase noise. In such a case, Doppler shifts of the OCT probe light due to motion of the sample with respect to the OCT interferometer are indistinguishable from Doppler shifts arising from blood flow. In some real-time medical OCT imaging applications, such as retinal imaging, in which the sample is living, sample motion is unavoidable and physical stabilization of the eye, for example, with respect to the interferometer is not practical.

Accordingly, there is a need in the art for an improved device and method for Doppler OCT, which overcomes the above-referenced problems and others.

SUMMARY OF THE INVENTION

According to one aspect of the invention, the invention is directed to a Doppler optical coherence tomography (OCT) system. The Doppler OCT system includes a phase-referenced interferometer. The phase-referenced interferometer can generate an OCT interferometric data output signal and a reference interferometric data output signal. A correction processor can correct the OCT interferometric data output signal using the reference interferometric data output signal. A data processing system, which is operatively coupled to the correction processor, can generate a velocity-indicating image using the corrected OCT interferometric data output signal.

According to another aspect of the present invention, the invention is directed to a Doppler optical coherence tomography (OCT) system. The system can include an interferometer having a low-coherence optical radiation source, a reference optical radiation sources, a sample arm and a reference arm. The interferometer can generate an OCT interferometric data output and a reference interferometric data output. A pair of detectors can detect the OCT interferometric data output and the reference interferometric data output. A data processing system can correct the detected OCT interferometric data output using the reference interferometric data output and generate a velocity-indicating OCT image using the corrected OCT interferometric data output.

According to another aspect of the present invention, the invention is directed to a method for performing Doppler optical coherence tomography (OCT) imaging of a sample. The method can include producing low-coherence optical radiation and co-propagating continuous wave (CW) optical radiation with the low coherence optical radiation. At least some of the low-coherence and CW optical radiation is directed to the sample and an optical delay line (ODL). The low coherence and CW optical radiation reflected back from the sample and the ODL is detected. Motion-induced defects in a velocity estimate corresponding to the detected low-coherence optical radiation are corrected using the detected CW optical radiation.

According to another aspect of the present invention, the invention is directed to a method for correcting noise associated with sample motion and/or radiation path jitter in a non-invasive optical imaging system. The method can include providing a reference optical radiation source and propagating optical radiation from the reference source along the same optical radiation paths as a low-coherence optical radiation source. The optical radiation from the reference source is detected and signals indicative of detected low-coherence optical radiation are corrected with signals indicative of detected reference optical radiation.

According to another aspect of the present invention, the invention is directed to a non-invasive optical imaging system. The system can include a low-coherence optical radiation source, a reference optical radiation source, and at least one optical path between the optical radiation sources and a sample. The system can include a pair of detectors for detecting radiation from the low-coherence optical radiation source and the reference optical radiation source after interaction with the sample. A correction processor can correct signals indicative of detected low-coherence optical radiation using signals indicative of detected reference optical radiation.

According to another aspect of the invention, the invention is directed to a method for correcting noise associated with sample motion and/or interferometer jitter in a Doppler optical coherence tomography (OCT) system. The method can include coupling reference light into a fiber optic interferometer to co-propagate with OCT source light, thereby acquiring all Doppler shifts and phase noise in common with the OCT light. An OCT interferogram and a reference interferogram are detected and the reference interferogram is used to correct the OCT interferogram to provide a phase-noise free Doppler signal.

BRIEF DESCRIPTION OF DRAWINGS

These and further features of the present invention will be apparent with reference to the following description and drawings, wherein.

DISCLOSURE OF INVENTION

Figure 1:
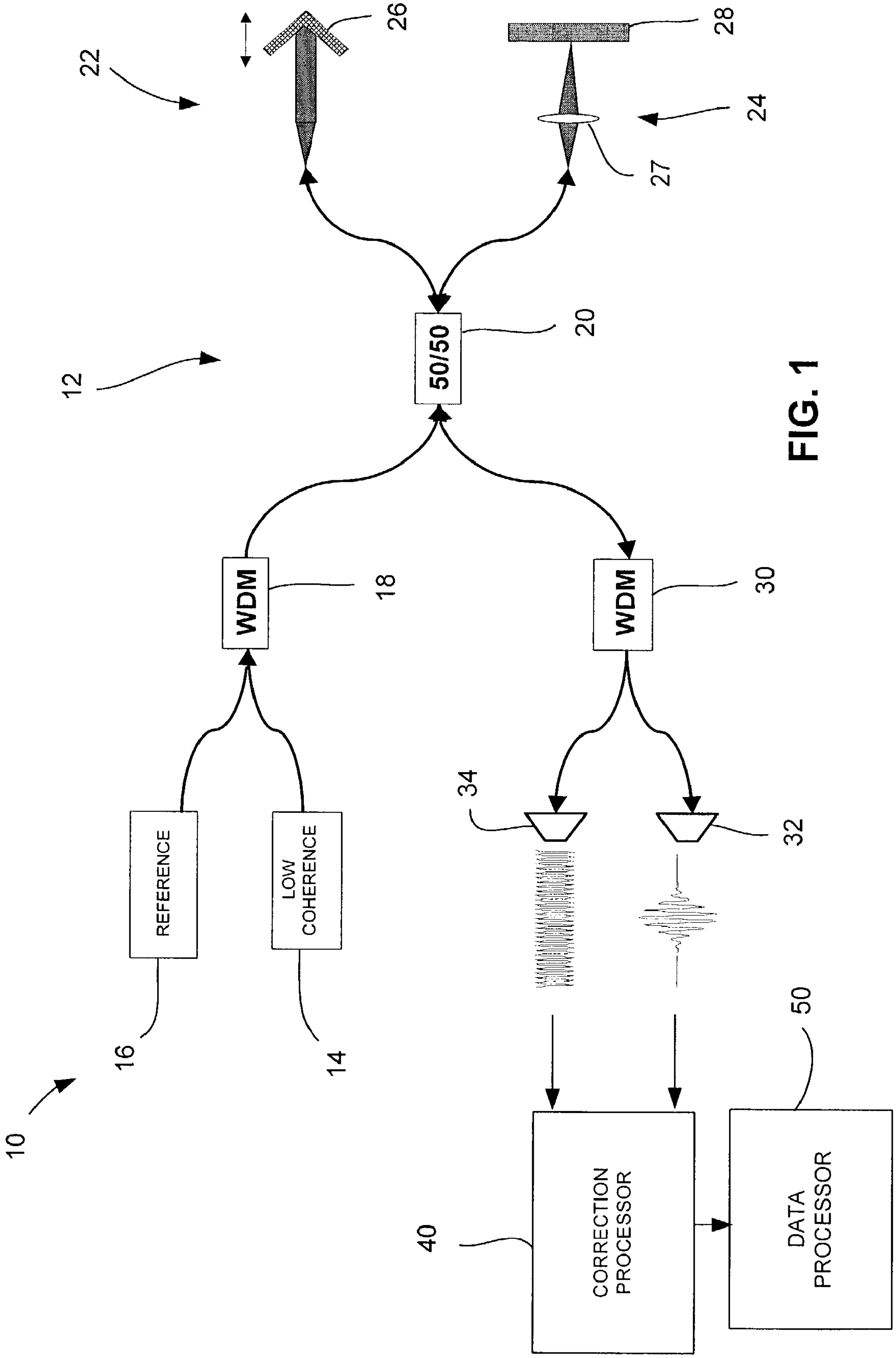
FIG. 1 is a diagrammatic illustration of a Doppler optical coherence tomography (OCT) system in accordance with the present invention.

In the detailed description that follows, corresponding components have been given the same reference numerals regardless of whether they are shown in different embodiments of the present invention. To illustrate the present invention in a clear and concise manner, the drawings may not necessarily be to scale and certain features may be shown in somewhat schematic form.

With reference to FIG. 1, a Doppler optical coherence tomography (OCT) system 10 is provided. The Doppler OCT system 10 can include an interferometer 12, such as a phase-referenced fiber-based interferometer. In one embodiment, the interferometer 12 can include a low-coherence optical radiation or light source 14, such as a super-luminescent diode (SLD) source and a continuous wave (CW) reference optical radiation source 16. In one embodiment, the low-coherence source 14 can be a 1310 nm SLD source having a power rating of 10 mW, a bandwidth of 47 nm and a coherence length of 16 microns, while the reference source 16 can be a 633 nm HeNe laser having a power rating of 8 mW. While the present invention is described in terms of an OCT system, including Doppler imaging, it is to be appreciated that the present invention may be employed in conjunction with any optical imaging system in which a reference source is used in conjunction with a low-coherence optical radiation source without departing from the scope of the present invention. Further, while the present invention is described with respect to a fiber-based Michelson interferometer design, it is to be appreciated that the present invention is applicable to any interferometer architecture.

The low-coherence source 14 and the reference source 16 can be coupled or otherwise combined using a wavelength division multiplexer (WDM) 18. This composite beam then illuminates the fiber-optic OCT interferometer 12, which includes a fiber-optic beam splitter 20 (such as a fused-taper 50/50 fiber coupler). The beam splitter 20 separates the combined optical radiation received from the low-coherence source 14 and the reference source 16 into two combined beams. It is to be appreciated that the beam splitter could be other than a 50/50 or balanced fiber coupler, such as an unbalanced fiber coupler (e.g., $\alpha/(1-\alpha)$). One beam is transmitted to a reference aim 22 via an optical fiber and the other combined beam is transmitted to a sample arm 24 via an optical fiber. The sample arm can include a sample probe, including a beam-steering mirror 27 to focus the combined optical radiation on a sample 28. The sample arm 24 optics is adapted to focus light on the sample 28 and receive the light reflected back from the sample 28. The reflected light received back from the sample 28 can be transmitted back to the beam splitter 20 via the sample arm optical fiber. In one embodiment, the sample probe has an adjustable focal length, thus allowing adjustment of the focal spot size, working distance and depth of focus.

Artisans will appreciate that the beam splitter 20 also directs light to the reference arm 22, which can include appropriate beam-steering optics and a movable reference element 26, such as a scanning corner cube optical delay line (ODL) (typically mounted on a galvanometer) or a translating reference mirror. The reflected light received back from the reference element 26 is transmitted back to the beam splitter 20 via the reference arm optical fiber. The reflected light received by the beam splitter 20, back from both the sample arm 24 and reference arm 22 is combined and transmitted along a fiber-optic line. At the output of the interferometer, a second WDM 30 separates and directs the low-coherence light and the reference light to a pair of photoreceivers or photodetectors 32, 34, such as an InGaAs detector and a Si detector, as shown. The photodetectors can then produce an analog signal, in response to the intensity of the incident electric field.

The optical path length of the sample arm 24 is a function of the distribution of scattering sites within the sample 28, while the optical path length of the reference arm 22 changes with the translation of the ODL or reference mirror 26. Because a low coherence light source is used, a fringe pattern (also known as an interferometric signal) is produced at the first photodetector when the optical path length to a reflecting or scattering site within the sample matches the optical path length of the reference, within a coherence length. The fringe pattern observed is a function of the optical path length distance between the sample and reference arms. Translating the reference element provides interferogram data, which is the optical path length dependent cross-correlation function of the light retro-reflected from the reference element 26 and the sample 28. Collecting interferogram data for a point on the sample 28 for one reference mirror cycle can be referred to as collecting an "A-scan". It is to be appreciated that the A-scan data provides a one-dimensional profile of reflecting and scattering sites of the sample 28 versus depth within the sample 28.

It is to be appreciated that many methods and/or mechanisms for injecting the above reference arm delay can be employed within the scope of the present invention. Alternative reference arm optical delay strategies include those which modulate the length of the reference arm optical fiber by using a piezo-electric fiber stretcher, methods based on varying the path length of the reference arm by passing the light through rapidly rotating cubes or other rotating optical elements, and methods based on Fourier-domain pulse-shaping technology which modulate the group delay of the reference arm light by using an angularly scanning mirror to impose a frequency-dependent phase on the reference arm light after having been spectrally dispersed.

The first photodetector 32 generates an OCT interferometric data output signal, while the second photodetector 34 generates a reference interferometric data output signal. The OCT interferometric data output signal can be coherently demodulated, sampled, and processed using a variety of techniques (such as short-time Fourier transform or autocorrelation techniques) to generate a velocity-indicating or Doppler image, as well as a gray scale image. These digital signal processing techniques, as well as a full discussion the effect of Doppler imaging, can be found in co-owned U.S. Pat. No. 6,006,128, which is incorporated herein by reference in its entirety.

Artisans will appreciate that OCT Doppler flow monitoring is based on the principle that Doppler shifts in light backscattered from moving objects in the sample either add to or subtract from the fixed Doppler shift frequency induced by the reference arm delay. However, Doppler OCT systems are now sensitive enough to flow velocity that jitter due to instability to the interferometer components and/or motion of the sample with respect to the OCT interferometer becomes a limiting source of phase noise. In such a case, Doppler shifts of the OCT probe light due to motion of the sample with respect to the OCT interferometer are indistinguishable from Doppler shifts arising from fluid flow (e.g., blood flow). Accordingly, the system shown in FIG. 1 couples the reference source 16 to the low-coherence source 14 to compensate for or correct motion-induced phase noise. The reference beam from the reference source 16 propagates with the low-coherence or OCT beam to the reference optical delay line as well as to the sample, acquiring the same Doppler shifts due to delay line motion and jitter and sample motion.

However, with a long coherence length, the reference signal will be dominated by a strong reflection from the sample surface (such as a cornea in retinal imaging) and integrated over the long coherence length, in contrast to the low coherence OCT signal, which will be localized in the sample due to the short coherence length of the OCT beam. Therefore, both the low-coherence OCT and reference beams will acquire in common all motion-induced phase noise, while only the low coherence OCT signal will carry the blood flow information.

With continued reference to FIG. 1, the OCT interferometric data output signal detected by the first photodetector 32 and the reference interferometric data output signal detected by the second photodetector 34 are transmitted to a correction processor 40 (which may include a trigger generator 42) and, ultimately, to a data processing system 50, which will generate at least one of a gray-scale image, a Doppler or velocity-indicating image and/or a combination gray-scale Doppler image. As is described more fully below, the correction processor 40 is operative to correct the detected OCT interferometric data output signal using the reference interferometric data output signal. Subsequently, additional Doppler signal processing will use the corrected OCT interferometric data output signal.

Figure 2:
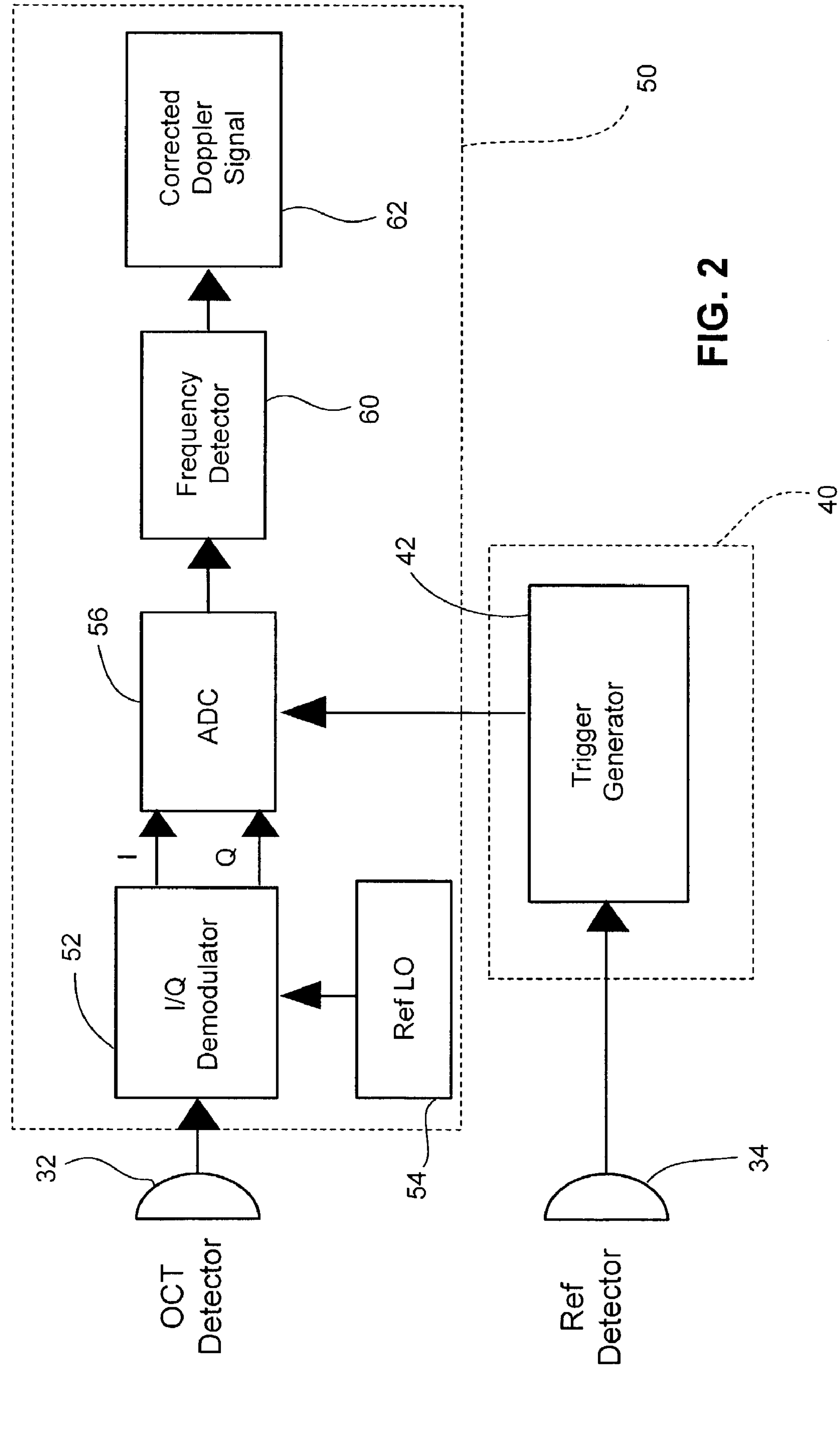
FIG. 2 is a diagrammatic illustration of a Doppler OCT correction processor and data processing system in accordance with one embodiment of the present invention.

With reference to FIG. 2 and continued reference to FIG. 1, one embodiment of the correction processor 40 and data processing system 50 is provided. In one embodiment, the reference interferometric data output signal detected by the reference photodetector 34 is used to generate a sampling trigger with which to digitize or otherwise sample the low-coherence OCT interferometric data output signal. The OCT interferometric data output signal from the OCT photodetector 32 can be transmitted to a demodulator 52, which coherently demodulates the interferogram data at the frequency corresponding to the Doppler shift induced by the reference element 26 to produce a series of analogue in-phase "I" component data vs. time and a series of analogue quadrature "Q" component data vs. time. The demodulator 52 can be controlled or otherwise clocked by an associated local oscillator 54. The analog in-phase "I" data series and analog quadrature "Q" can be fed into an analog-to-digital converter (ADC), which can convert the analog in-phase "I" data series and analog quadrature "Q" data series into a digital in-phase data array and a digital quadrature data array, respectively. Alternatively, the OCT interferometric signal can be sampled before or without passing through the demodulator 52.

Figure 4:
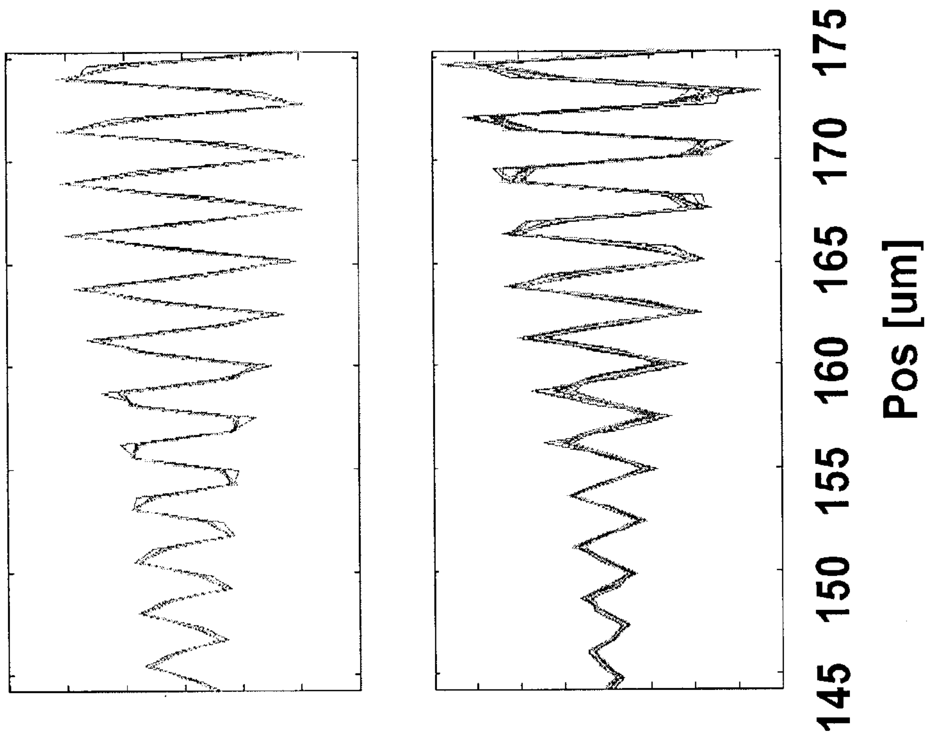
FIG. 4 shows exemplary plots of amplitude vs. position for phase-referenced resampled data equivalent to the data shown in FIG. 3.
Figure 3:
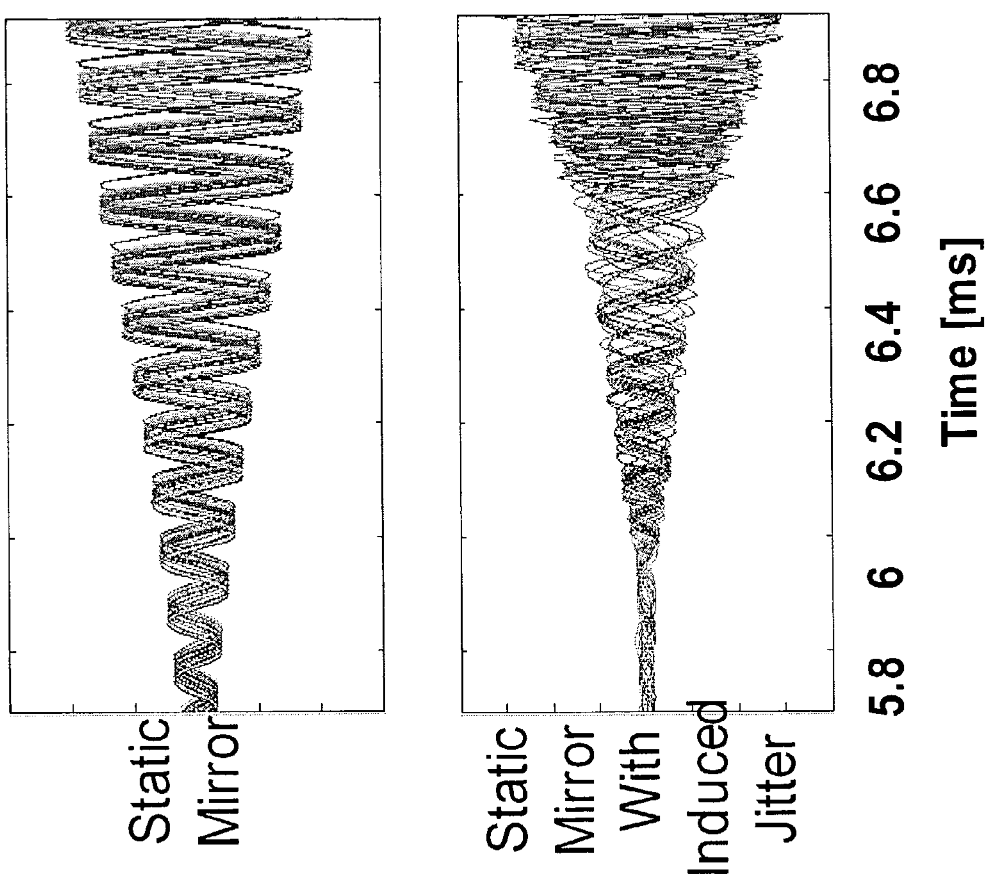
FIG. 3 shows exemplary plots of amplitude vs. time for a plurality of A-scans recorded in rapid succession, with a static and a jitter-induced reference element, respectively.

In one embodiment, the correction processor 40 includes the mentioned trigger generator 42. The trigger generator 42 can generate a sampling trigger signal, which is sent to the ADC 56, with which to digitize the OCT interferometric signal. In one embodiment, this triggering results in a synchronous sampling of the OCT interferometric data triggered by, for example, zero-crossings of the reference interferometric data. FIG. 3 is a plot of amplitude vs. time for a set of twenty OCT interferograms (also referred to as A-scan) recorded in rapid succession. The plot shown in the upper portion of FIG. 3 shows a plurality of OCT interferograms collected using a static mirror reference element, while the lower portion of FIG. 3 shows a plurality of OCT interferograms collected using static mirror with induced jitter. As can be seen from FIG. 3, significant phase noise exists with the asynchronously acquired OCT interferograms. In contrast, FIG. 4 illustrates the same plurality of A-scans collected using the phase-referenced synchronous sampling in accordance with one embodiment of the present invention. While the subsequent scans illustrated in FIG. 3 are clearly uncorrelated, the phase-referenced, sampled scans shown in FIG. 4 are in phase. It is to be appreciated that these scans are now a function of position, rather than time, such that velocity noise is largely cancelled. Further, a "hardware implementation" of a trigger generator facilitates real-time imaging. Alternatively, the scans can be synchronously resampled using, for example, appropriate software.

Referring again to FIG. 2, once the OCT interferometric data is corrected via sampling, which is triggered using the reference interferometric data, a time-frequency analysis is performed on the data using a frequency detector 60. It is to be appreciated that the frequency detector 60 may perform one of a number of appropriate time-frequency analyses, including, but not limited to, short-time Fourier transforms, wavelet transforms, Hilbert transform processing, axial scan, sequential scan, or sequential image processing, or autocorrelation processing, as is described more fully below in U.S. Pat. No. 6,006,128. The frequency detector 60 is operative to produce a corrected Doppler signal 62, from which velocity information is extracted in order to provide a color Doppler image or other velocity-indicating image, which may, optionally, be combined with a gray scale image.

Figure 5:
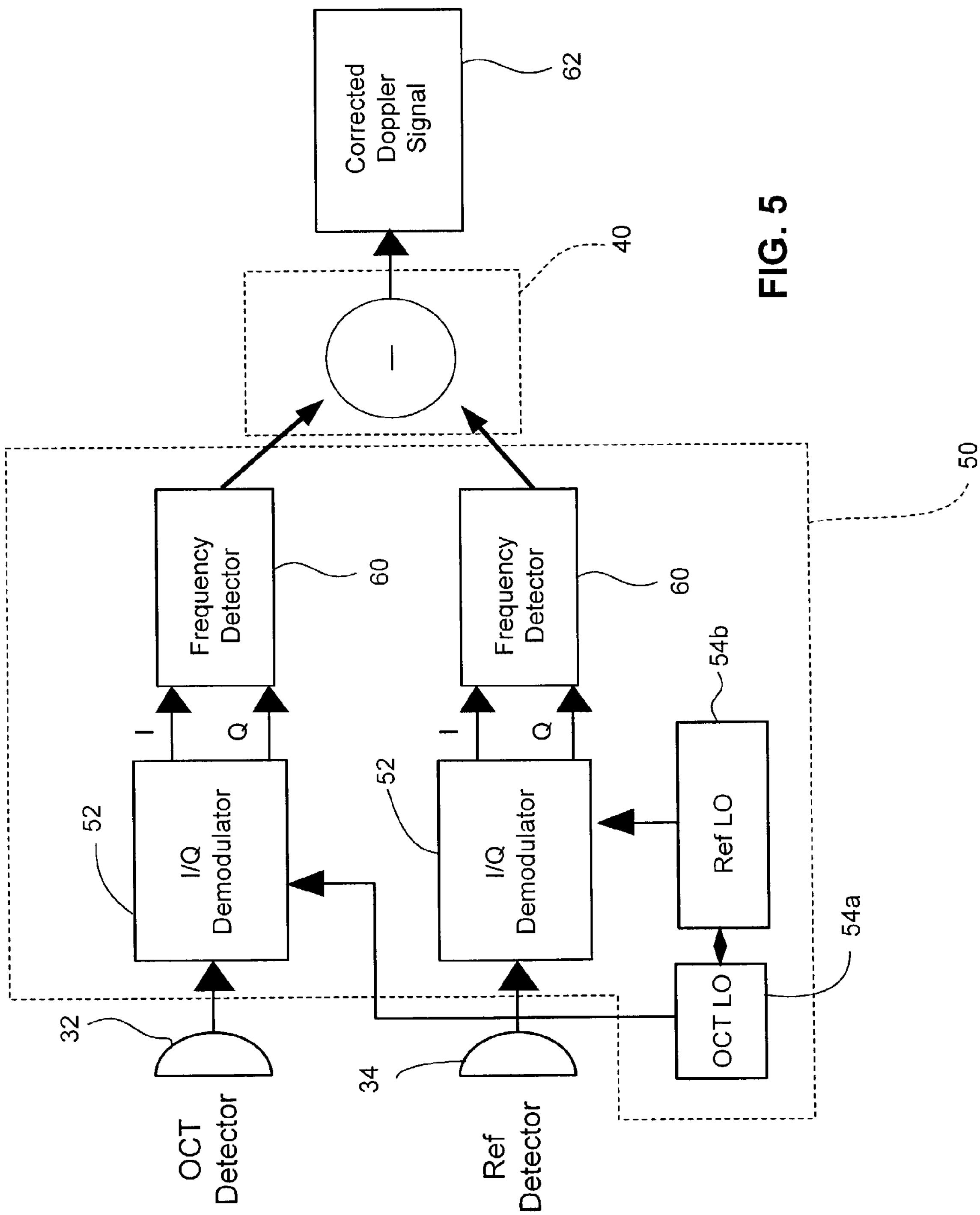
FIG. 5 is a diagrammatic illustration of a Doppler OCT correction processor and data processing system in accordance with an alternative embodiment of the present invention.

With reference now to FIG. 5, a correction processor 40 and data processing system 50 are provided in accordance with an alternative embodiment of the present invention. As described above, OCT interferometric data signals and reference interferometric data signals are produced by respective photodetectors 32, 34 in responsive to incident optical radiation. This data can be transmitted to one or more demodulators 52, which each coherently demodulate the OCT and reference interferometric data at the frequency corresponding to the Doppler shift induced by the reference element. Optionally, each demodulator 52 can be controlled or otherwise clocked by associated local oscillators 54*a*, 54*b*, which may be phased locked with one another. As described more fully above, the demodulators 52 each produce a series of analog in-phase "I" component data vs. time and a series of analog quadrature "Q" component data vs. time.

The demodulated OCT and reference interferometric data can be transmitted to one or more frequency detectors 60. As described above and more fully in U.S. Pat. No. 6,006,128, instantaneous velocity estimates (in the form of two-dimensional plots) can be calculated using one of a number of joint time-frequency analysis techniques, including, but not limited to, short-time Fourier transforms, wavelet transforms, autocorrelation processing, Hilbert transform processing and the like. The instantaneous velocity estimate calculated based on the reference interferometric data can be subtracted from the instantaneous velocity estimate calculated based on the OCT interferometric data using a subtractor 46 or other suitable device. Accordingly, the difference of the velocity estimates will yield a corrected Doppler signal or jitter-free flow velocity.

Figure 6:
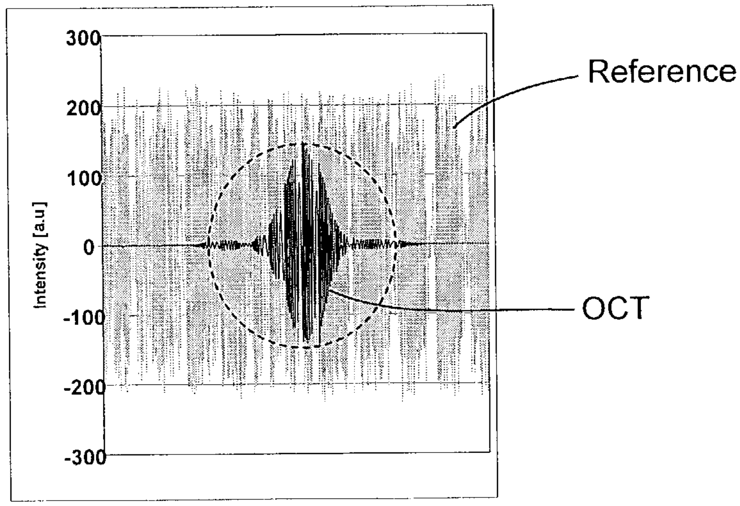
FIG. 6 is an exemplary plot of OCT and reference interferograms.
Figure 7:
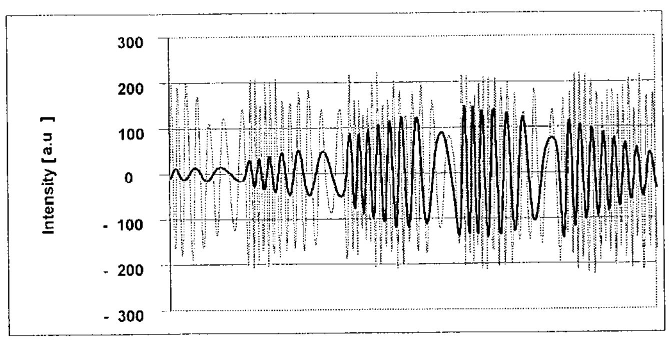
FIG. 7 is a plot of a detailed portion of the plot shown in FIG. 6.
Figure 8:
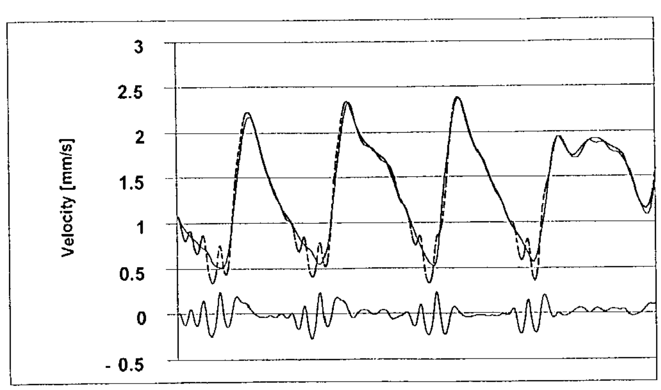
FIG. 8 shows plots of estimated velocity determined from the interferograms shown in FIG. 7 and the difference between the estimated velocities.

For example, FIG. 6 illustrates exemplary OCT and reference interferograms, which, for example, were recorded over a range of 0.1 mm at an average velocity of 1.36 mm/sec. FIG. 7 illustrates a detailed section of the scan in a region of the OCT interferogram peak. In this exemplary embodiment, the reference interferogram has a higher fringe frequency, corresponding to its shorter wavelength. FIG. 8 illustrates a velocity calculated from the OCT reference interferogram and the reference interferogram, respectively, in a manner such as is described above. In addition, FIG. 8 shows the difference between the two aforementioned velocities. The variance of the uncorrected velocity determined from the OCT interferometric data (restricted to the range shown in FIG. 7) is about 0.288 mm/sec. In contrast, the variance of the velocity difference (i.e., the corrected velocity) is about 2.6 microns/sec, yielding an improvement of two orders of magnitude.

It is to be appreciated that the present invention is applicable to other non-invasive optical imaging systems. For example, the present invention may be employed to correct noise associated with sample motion and/or radiation path jitter. In one embodiment, a reference optical radiation source can be provided and optical radiation therefrom co-propagated along with a low-coherence optical radiation source. The reference optical radiation source can be detected and used to correct signals, whether they be interferometric or otherwise, indicative of detected low-coherence optical radiation.

Although, particular embodiments of the invention have been described in detail, it is understood that the invention is not limited correspondingly in scope, but includes all changes, modifications, and equivalents coming within the spirit and terms of the claims appended hereto. In addition, it is to be appreciated that features shown and described with respect to a given embodiment may also be used in conjunction with other embodiments.

What is claimed is:

1. A Doppler optical coherence tomography (OCT) system comprising:

- a phase-referenced interferometer, the phase-referenced interferometer generating an OCT interferometric data output signal and a reference interferometric data output signal, wherein the phase-referenced interferometer comprises:
  - a low-coherence optical source;
  - a reference optical source;
  - a sample arm;
  - a reference arm;
  - a first detector for detecting low-coherence optical radiation from the sample arm and the reference arm; and
  - a second detector for detecting reference optical radiation from the sample arm and the reference arm;
- a correction processor for correcting the OCT interferometric data output signal using the reference interferometric data output signal; and
- a data processing system, operatively coupled to the correction processor, said data processing system generating a velocity-indicating image using the corrected OCT interferometric data output signal.

2. The Doppler OCT system as set forth in claim 1, wherein the correction processor comprises:

- a trigger generator which sends a sampling trigger signal to an analog-to-digital converter based on the reference interferometric data output signal.

3. The Doppler OCT system as set forth in claim 1, wherein the correction processor comprises:

- a subtracter which subtracts a reference velocity plot from an OCT velocity plot, wherein the reference velocity plot is computed from the reference interferometric data output signal and the OCT velocity plot is computed from the OCT interferometric data output signal.

4. The Doppler OCT system as set forth in claim 1, wherein the phase-referenced interferometer further comprises:

- a first fiber multiplexer for combining optical radiation from the low-coherence optical source and the reference optical source;
- a beam splitter having an input connected to an output of the first multiplexer, said beam splitter (i) directing the combined optical radiation to the sample arm and the reference arm and (ii) combining reflected optical radiation from the sample arm and the reference arm; and
- a second fiber multiplexer connected to an output of the beam splitter for separating the reflected optical radiation from the beam splitter and directing the reflected optical radiation to the first and second detectors.

5. The Doppler OCT system as set forth in claim 4, wherein the first and second fiber multiplexers are a wavelength division multiplexers (WDM).

6. The Doppler OCT system as set forth in claim 1, wherein the reference optical source is a high coherence, continuous-wave source.

7. The Doppler OCT system as set forth in claim 6, wherein the reference optical source is a HeNe laser.

8. A method for performing Doppler optical coherence tomography (OCT) imaging of a sample, said method comprising:

producing low-coherence optical radiation;

co-propagating continuous wave (CW) optical radiation with the low coherence optical radiation;

directing at least some of the low-coherence and CW optical radiation to the sample and to an optical delay line (ODL);

detecting the low coherence and CW optical radiation reflected back from the sample and the ODL; and correcting motion-induced defects in a velocity estimate corresponding to the detected low-coherence optical radiation using the detected CW optical radiation.

9. The method as set forth in claim 8, wherein the correcting step includes:

triggering a sampling of a signal indicative of the detected low-coherence optical radiation using a signal indicative of the detected CW optical radiation.

10. The method as set forth in claim 8, wherein the correcting step includes:

producing a first velocity estimate corresponding to the detected low-coherence optical radiation;

producing a second velocity estimate corresponding to the detected CW optical radiation; and subtracting the second velocity estimate from the first velocity estimate.

11. A method for correcting noise associated with at least one of (i) sample motion, and (ii) radiation path jitter in a non-invasive optical imaging system, said method comprising:

providing a reference optical radiation source;

propagating optical radiation from the reference source along the same optical radiation paths as a low-coherence optical radiation source;

detecting the optical radiation from the reference source; and correcting signals indicative of detected low-coherence optical radiation with signals indicative of detected reference optical radiation.

12. The method as set forth in claim 11, wherein the correcting step includes:

triggering a sampling of a signal indicative of the detected low-coherence optical radiation using a signal indicative of the detected reference optical radiation.

13. The method as set forth in claim 12, wherein the triggering is performed using zero-crossings of the signal indicative of the detected reference optical radiation.

14. The method as set forth in claim 11, wherein the correcting step includes:

producing a first velocity estimate corresponding to detected low-coherence optical radiation;

producing a second velocity estimate corresponding to the detected reference optical radiation; and subtracting the second velocity estimate from the first velocity estimate.

15. The method as set forth in claim 14, wherein the first and second velocity estimates are produced using an autocorrelation processing technique.

16. The method as set forth in claim 11, wherein the non-invasive optical imaging system is a Doppler optical coherence tomography imaging system.

17. The method as set forth in claim 16, wherein the reference optical radiation source is a HeNe laser.

18. A non-invasive optical imaging system comprising:

a low-coherence optical radiation source;

a reference optical radiation source;

at least one optical path between the optical radiation sources and a sample;

a pair of detectors for detecting radiation from (i) the low-coherence optical radiation source, and (ii) the reference optical radiation source after interaction with the sample;

a correction processor for correcting signals indicative of detected low-coherence optical radiation using signals indicative of detected reference optical radiation.

19. The system as set forth in claim 18, wherein the correction processor includes:

a trigger generator which sends a sampling trigger signal to an analog-to-digital converter based on the signals indicative of the detected reference optical radiation.

20. The system as set forth in claim 18, wherein the correction processor includes:

a subtracter which subtracts a reference velocity plot from an OCT velocity plot, wherein the reference velocity plot is computed from the signals indicative of the detected reference optical radiation and the OCT velocity plot is computed from the signals indicative of the detected low-coherence optical radiation.

21. The system as set forth in claim 18, wherein the non-invasive imaging system is an optical coherence tomography imaging system.

22. A method for correcting noise associated with at least one of (i) sample motion and (ii) interferometer jitter in a Doppler optical coherence tomography (COT) system, said method comprising:

(a) coupling reference light into a fiber optic interferometer to co-propagate with OCT source light, thereby acquiring all Doppler shifts and phase noise in common with the OCT light;

(b) detecting an OCT interferogram an&a reference interferogram; and (c) using the reference interferogram to correct the OCT interferogram to provide a phase-noise free Doppler signal.

23. The method as set forth in claim 22, wherein step (c) includes:

triggering a sampling of the OCT interferogram using the reference interferogram.

24. The method as set forth in claim 23, wherein the triggering is performed using zero-crossings of the reference interferogram.

25. The method as set forth in claim 22, wherein step (c) includes:

producing a first velocity estimate corresponding to the detected OCT interferogram;

producing a second velocity estimate corresponding to the detected reference interferogram; and subtracting the second velocity estimate from the first velocity estimate.

26. The method as set forth in claim 25, wherein the first and second velocity estimates are produced using an autocorrelation processing technique.

* * * * *

UNITED STATES PATENT AND TRADEMARK OFFICE

CERTIFICATE OF CORRECTION

PATENT NO. : 7,006,232 B2
APPLICATION NO. : 10/408745
DATED : February 28, 2006
INVENTOR(S) : Andrew M. Rollins et al.

It is certified that error appears in the above-identified patent and that said Letters Patent is hereby corrected as shown below:

In the Specification,

Please insert the following starting at line 12, column 1.

--GOVERNMENT FUNDING

This invention was made with government support under EY013015 awarded by The National Institutes of Health. The United States government has certain rights to the invention.--

Signed and Sealed this
Twenty-seventh Day of October, 2015

Michelle K. Lee
*Director of the United States Patent and Trademark Office*